United States Patent [19]
Aoki et al.

[11] Patent Number: 5,216,880
[45] Date of Patent: Jun. 8, 1993

[54] CATALYTIC CONVERTER HEATER CONTROL SYSTEM FOR INTERNAL COMBUSTION ENGINE

[75] Inventors: Takuya Aoki; Yoshiharu Abe; Toshikazu Oketani, all of Wako, Japan

[73] Assignee: Honda Giken Kogyo Kabushiki Kaisha, Tokyo, Japan

[21] Appl. No.: 878,598

[22] Filed: May 5, 1992

[30] Foreign Application Priority Data

Jun. 24, 1991 [JP] Japan .............................. 3-056253[U]

[51] Int. Cl.$^5$ .............................................. F01N 3/20
[52] U.S. Cl. ........................................ 60/276; 60/277; 60/286; 60/300
[58] Field of Search ................. 60/276, 277, 300, 286; 123/688, 691

[56] References Cited

U.S. PATENT DOCUMENTS

| | | | |
|---|---|---|---|
| 3,969,932 | 7/1976 | Rieger | 60/277 |
| 5,101,625 | 4/1992 | Sugino | 60/276 |
| 5,146,743 | 9/1992 | Maus | 60/300 |

Primary Examiner—Douglas Hart
Attorney, Agent, or Firm—Nikaido, Marmelstein, Murray & Oram

[57] ABSTRACT

A catalytic converter heater control system for an internal combustion engine comprising a catalytic converter installed in the engine exhaust gas passage and having a small capacity section on its upstream side and a large capacity section on its downstream side. The system has a pair of oxygen sensors installed one on the upstream side and one on the downstream side of the catalytic converter, a heater installed on the small capacity reaction section for heating incoming exhaust gas, and an electronic control unit for operating the heater when the difference between the outputs of the oxygen sensors is smaller than a prescribed value.

6 Claims, 3 Drawing Sheets

CATALYTIC CONVERTER HEATER CONTROL SYSTEM FOR INTERNAL COMBUSTION ENGINE

BACKGROUND OF THE INVENTION

1. Field of the Invention

This invention relates to a catalytic converter heater control system for an internal combustion engine, and more particularly to a catalytic converter heater control system whose exhaust gas pollutant removal efficiency is increased by promoting catalyst activation at engine cold start using outputs from oxygen sensors installed upstream and downstream of the catalytic converter.

2. Description of the Prior Art

A control system using two oxygen sensors installed upstream and downstream of a catalytic converter is able to achieve a stable feedback control of the air/fuel ratio based on the outputs of the sensors. Apart from the above, Japanese Patent Publication No. 47-20659 teaches a catalytic converter provided at the inlet end with a heater for rapidly heating the exhaust gas to the catalyst activation temperature, and thus quickly making the converter functional, at the time of cold engine start. The catalytic converter taught by the reference thus requires a temperature sensor on the outlet side of the converter. This increases the number of components needed and the number of assembly steps required for installing the system.

It is therefore an object of this invention to provide a catalytic converter heater control system which improves, without needing any additional temperature sensor, exhaust gas pollutant removal efficiency especially at the time of cold engine start.

SUMMARY OF THE INVENTION

This invention achieves this object by providing a system for controlling an operation of a heater equipped in a catalytic converter provided in an exhaust passage of an internal combustion engine, the system having oxygen sensors installed in the passage upstream and downstream of the catalytic converter. The system comprises first means for determining if the oxygen sensors are activated, second means for presuming if a catalyst in the converter is activated in response to the outputs of the oxygen sensors when the oxygen sensors are determined to be activated, and control means for turning on the heater to heat, the catalytic converter when the catalyst in the converter is presumed to be not activated.

BRIEF EXPLANATION OF THE DRAWINGS

These and other objects and advantages of the invention will be more apparent from the following description and drawings, in which.

DETAILED DESCRIPTION OF PREFERRED EMBODIMENT

An embodiment of the invention will now be explained with reference to the drawings.

Figure 1:
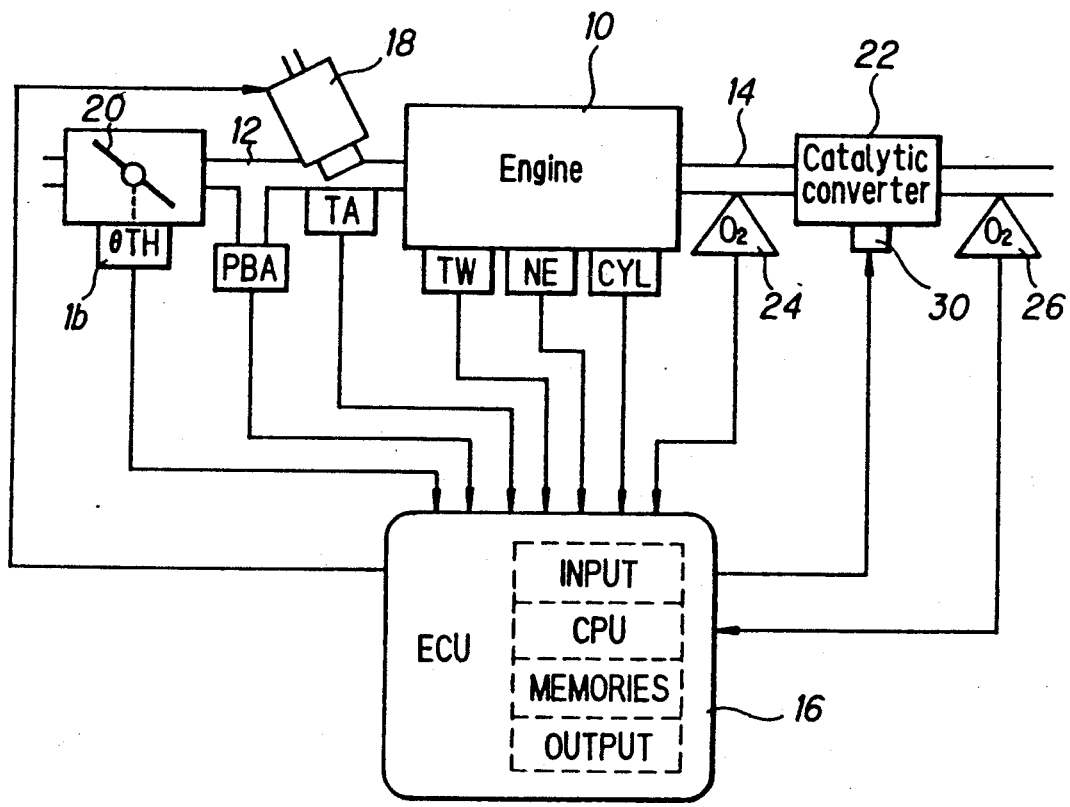
FIG. 1 is an explanatory view showing an overall arrangement of a catalytic converter heat control system according to the present invention.

As shown in FIG. 1, a multi-cylinder internal combustion engine 10 is connected with an air intake passage 12 on one side and with an exhaust passage 14 on the other. The outputs of various sensors installed on the intake passage, engine and exhaust passage are sent to an electronic control unit 16 made up of a microcomputer which processes them for producing a control signal for an air/fuel control of the engine 10.

The air intake passage 12 is provided with a fuel injection valve 18 and a throttle valve 20, and a three-way catalytic converter 22 is provided in the exhaust passage 14. Two oxygen sensors 24 and 26 for detecting the oxygen content of the exhaust gas are provided respectively on the upstream and downstream of the catalytic converter 22. The oxygen sensors 24, 26 become capable of detecting oxygen concentration after they have been raised to their activation temperature by the heat of the exhaust gas. At that instant, their signal output level reaches a prescribed value. The outputs of the sensors are sent to the control unit 16 which, based thereon, conducts the air/fuel ratio feedback control by adjusting an opening period of the fuel injection valve 18 basically determined in accordance with the engine speed NE and load PBA.

Figure 2:
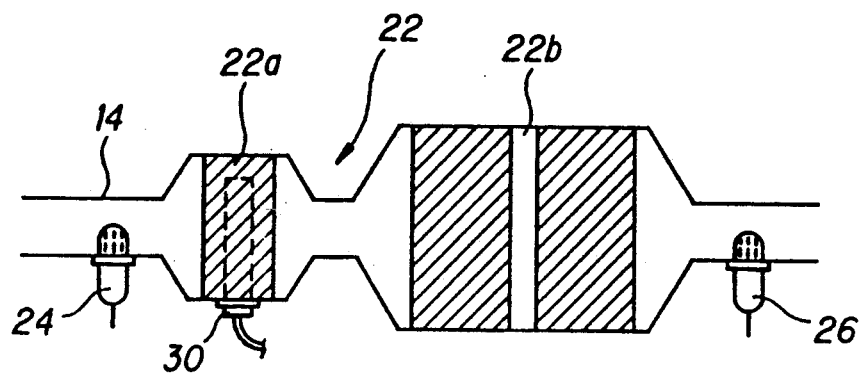
FIG. 2 is an enlarged and sectional explanatory view of the exhaust passage structure shown in FIG. 1.

FIG. 2 illustrates the structure of the exhaust passage in detail. As shown, the catalytic converter 22 is divided into a first section 22a situated on the upstream end relative to the direction of exhaust gas flow in the exhaust passage 14 and a second section 22b situated on the downstream end. The first section 22a contains a smaller amount of a three-way catalyst than that contained in the second section 22b and is enclosed within a heater 30 for heating the incoming exhaust gas. When the heat produced by the heater 30 raises the temperature of the first section 22a, the catalyst of the section 22a is rapidly activated even following a cold start of the engine 10. The heater 30 is controlled its operation by the control unit 16 in the manner explained at a later stage. The second section 22b, which is of conventional structure, also contains a three-way catalyst.

Figure 3:
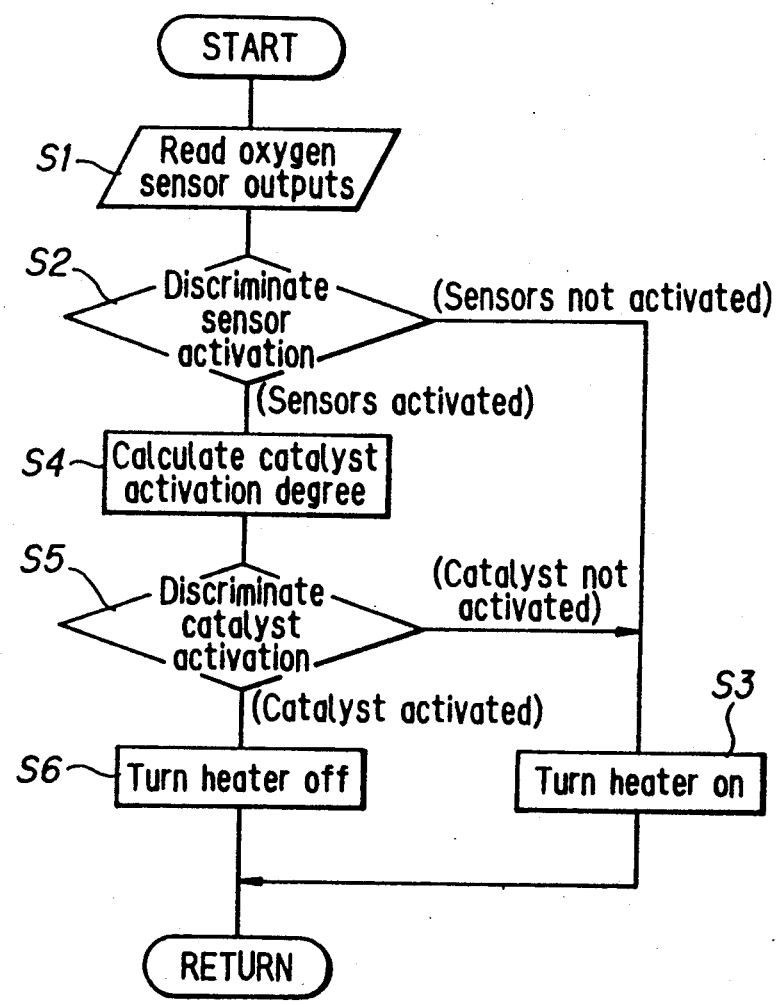
FIG. 3 is a flowchart showing the mode of operation of the system.

The operation of the catalytic converter heater control system in accordance with the invention will be explained in terms of the routine of the control unit 16 referring to a flowchart shown in FIG. 3.

It should be noted here that, following starting of the engine, the control unit 16 repeatedly executes the program within a prescribed period adequate for the temperature of the exhaust gas to reach the catalyst activation temperature, insofar as the battery voltage is at or above the prescribed value, and continues to do so until a heater operation flag (explained later) is reset, i.e. until a command for turning off the heater, once turned on, is issued. Moreover, the prescribed period during which execution is repeated is adjusted in the light of the condition of the engine 10 at the time of start determined from the output TW of a coolant temperature sensor or the like.

Following the start of the program, the outputs of the two oxygen sensors 24, 26 are read in at step S1 and forwarded to the following step S2 for discriminating sensor activation. If it is found in step S2 that the outputs of the two oxygen sensors 24, 26 have not reached the value predefined as indicating activation, the procedure goes to step S3 in which a command for turning on the heater is issued. At the same time, the flag indicating the heater operation is set to its bit to 1.

On the other hand, if it is found in step S2 that both of the oxygen sensors 24, 26 have reached the prescribed value indicating activation, the procedure advances to step S4 in which the degree of activation of the catalyst of the catalytic converter 22 is determined from the sensor outputs. Then, in the following step S5, the result indicating the degree of catalyst activation is compared with a prescribed reference value constituting a criterium for activation degree discrimination. If it has not reached the activation criterium, the procedure goes to step S3 for issuing the command to turn on the heater, and if it has, the procedure goes to step S6 for issuing a command to turn off the heater and discontinue heating of the first section 22a, while resetting the bit of the flag to 0.

Figure 4A:
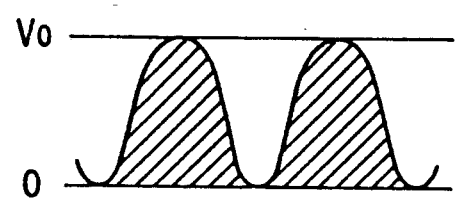
FIGS. 4(A) and 4(B) and 4(C) are wave form diagrams of the oxygen sensors shown in FIG. 1.
Figure 4B:
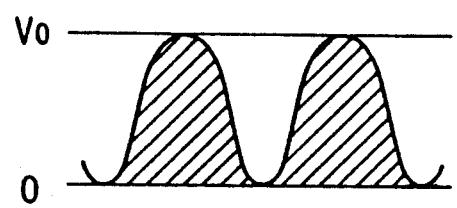
Figure 4C:
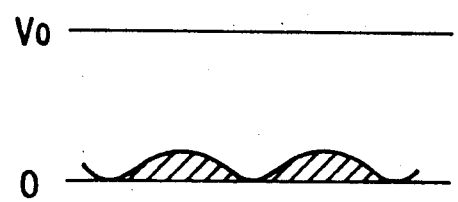

This will be explained with reference to FIG. 4. When the oxygen sensor 24 on the upstream side is in an activated state, it detects the oxygen content of the exhaust gas before catalytic reaction in the catalytic converter 22 and its output FIG. 4(A) fluctuates periodically within the range of 0-V0 in accordance with the exhaust strokes in the individual cylinders of the engine 10. When the catalytic converter 22 is not activated, no catalytic reaction occurs so that the exhaust gas passes through the catalytic converter 22 and reaches the downstream oxygen sensor 26 in an unchanged state. Provided that the downstream oxygen sensor 26 is activated, therefore, its output FIG. 4(B) is the same as that of the upstream oxygen sensor 24, namely it fluctuates periodically within the range of 0-V0 in accordance with the exhaust strokes in the individual cylinders.

When the catalytic converter 22 is in an activated state, the exhaust gas passing through it undergoes a catalytic reaction in which the oxygen in the exhaust gas reacts with the HC and CO therein, and the gas that has undergone this reaction thereafter reaches the oxygen sensor 26 on the downstream side. The output FIG. 4(C) of the oxygen sensor 26 at this time also fluctuates periodically in accordance with the exhaust strokes in the individual cylinders but the range of the fluctuation becomes smaller than the range 0-V0 of the upstream oxygen sensor fluctuation.

It is therefore possible to determine the degree of activation of the catalytic converter 22 in step S4 by obtaining the difference in outputs between the two oxygen sensors 24, 26. This will be carried out by detecting each maximum value of the sensor output signal waves, or by calculating each area thereof through integration, or using the method of numerical evaluation of the sensor outputs disclosed in Japanese Patent Application No. 2-117890 filed by the assignee. Thus, calculating in step S4 the activation degree for discriminating whether the catalytic converter 22 is activated or not, it suffices to establish the aforesaid reference value at or above which the catalytic converter 22 is defined as being "activated" and to compare the calculated activation degree with the reference value in step S5.

As explained in the foregoing, in the catalytic converter system of the present invention a heater is provided on a catalytic converter situated between two oxygen sensors and the control unit operates the heater when the difference between the outputs of the two oxygen sensors is smaller than the prescribed value. The heater can therefore be controlled in accordance with the activation degree of the catalytic converter. In an internal combustion engine whose air/fuel ratio is feedback controlled using the outputs of the two oxygen sensors located upstream and downstream of the catalyst converter, it therefore becomes possible to activate the catalyst and achieve removal of pollutants from the exhaust gas immediately after engine cold start merely by installing the heater for heating the catalyst converter and without need for additional components or additional assembly steps for installing such components.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling an operation of a heater equipped in a catalytic converter provided in an exhaust passage of an internal combustion engine, the system having oxygen sensors installed in the passage upstream and downstream of the catalytic converter; comprising:
   first means for determining if the oxygen sensors are activated;
   second means for determining if a catalyst in the converter is activated in response to the outputs of the oxygen sensors when the oxygen sensors are determined to be activated; and
   control means for turning on the heater to heat the catalytic converter when the catalyst in the converter is determined to be not activated.

2. A system according to claim 1, wherein said second means includes;
   third means for calculating a deviation between the sensor outputs; and
   fourth means for comparing the calculated deviation with a predetermined value; and
   said second means determines that the catalyst in the converter is not activated when the calculated deviation is found to be below the predetermined value.

3. A system according to claim 1, wherein the catalytic converter comprises a first section and a second section, the first section containing a smaller amount of a catalyst than that contained in the second section, and the heater is situated in the first section of the catalytic converter.

4. A system according to claim 3, wherein the first section of the catalytic converter is located upstream of the second section in the exhaust gas passage with respect to exhaust gas flow.

5. A system according to claim 1, wherein said control means turns on the heater when the oxygen sensors are determined to be not activated.

6. A system according to claim 1, the control means turns on the heater if the catalyst in the converter is determined to be not activated when it is in a period beginning from cold engine start determined from the operating condition of the engine.

* * * * *